July 31, 1956 — J. L. STOKES ET AL — 2,756,972
METERING DEVICE
Filed Jan. 26, 1955 — 2 Sheets-Sheet 1
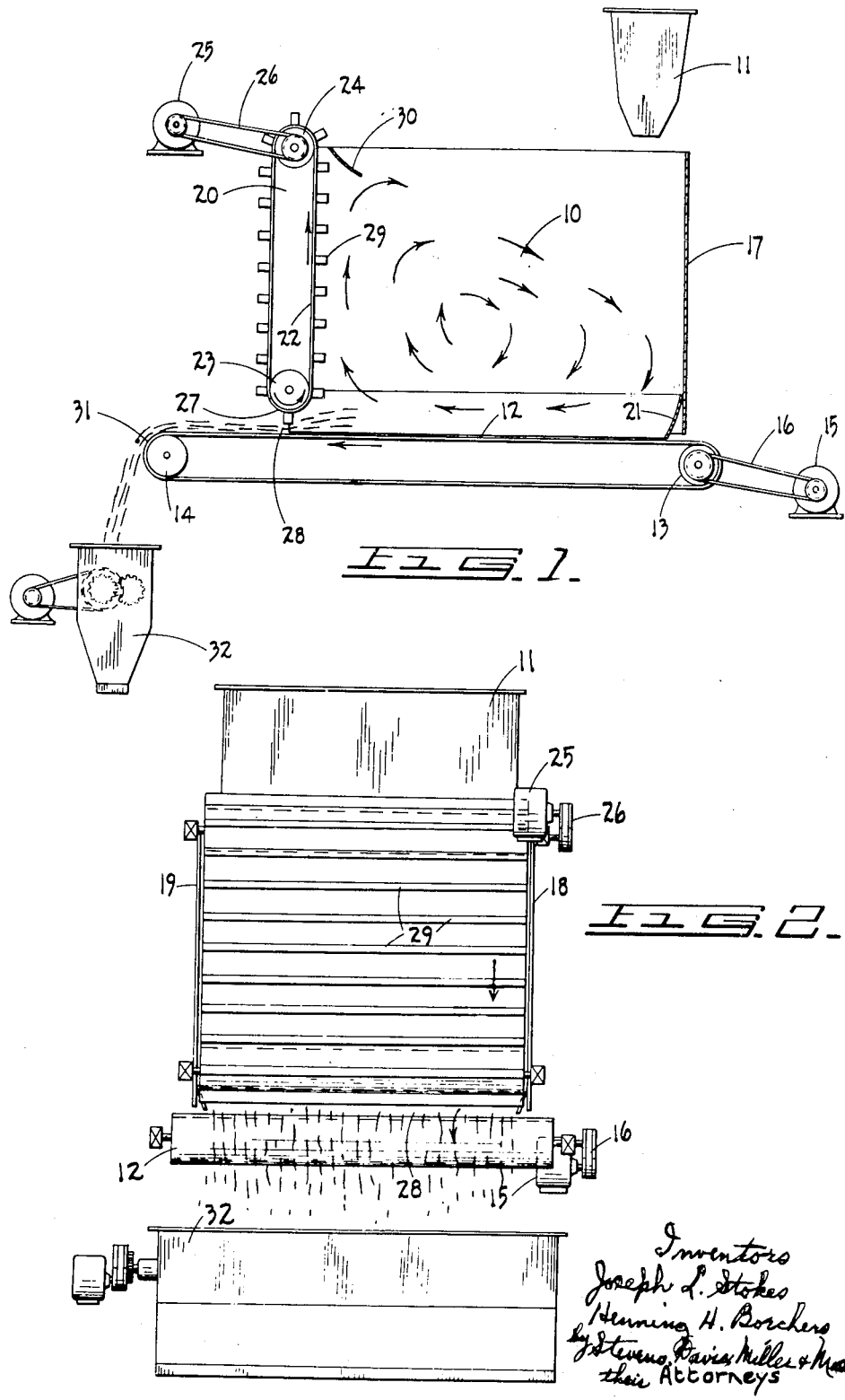

July 31, 1956  J. L. STOKES ET AL  2,756,972
METERING DEVICE

Filed Jan. 26, 1955　　　　　　　　　　　　　　2 Sheets-Sheet 2

Inventors
Joseph L. Stokes
Henning H. Borchers
By Stevens, Davis, Miller & Mosher
their Attorneys United States Patent Office 2,756,972
Patented July 31, 1956

2,756,972

METERING DEVICE

Joseph L. Stokes and Henning H. Borchers, Sault St. Marie, Ontario, Canada, assignors to Abitibi Power & Paper Company, Limited, Iroquois Falls, Ontario, Canada, a corporation of Canada Application January 26, 1955, Serial No. 484,242

Claims priority, application Canada July 6, 1954

4 Claims. (Cl. 259—37)

This invention relates to a metering device and more particularly to a device for metering the supply of non free-flowing products such as wood shavings or the like.

In the manufacture of a synthetic board from comminuted wood such as shavings, it is necessary to coat the shavings, which can be in the form of platelets with a binder such as urea-formaldehyde or phenolformaldehyde resin and it is advantageous to assure an even formation of such platelets, on a mould or the like. Such even formation can only be obtained through a closely controlled metered feed of the coated platelets. Of further advantage is the use of a dispersion unit which loosens up the coated shavings from the metering device before these are allowed to fall freely on the mould or the like. Such dispersion unit can be a mechanical device such as a pair of intermeshing spike rolls revolving against each other with a grid above the spike rolls to control the pick-up by the spikes. The platelets are picked up by the spikes reaching through the grid and are transferred onto a mould or forming belt located below the spike rolls. An alternative dispersion unit could be an air dispersion unit. A further alternative could be an inclined vibrating chute. In each case it is necessary to provide a metering unit which will give an even, uniform flow to the dispersion unit. This is particularly necessary where the process used involves continuous forming.

It has been found that the metering of shavings such as platelets which have been coated with resin presents a problem in that the coated shavings have poor flow characteristics and have a pronounced tendency to mat and bridge. The result is that, using conventional equipment, an uneven feed is produced or there may even be complete obstruction to the feed. Any unevenness in the feed from the metering unit to the dispersion unit is likely to result in an uneven distribution of the platelets on the mould surface and consequently the board finally produced will be of variable density resulting in a variation of board properties depending directly on density such as strength, nail and screw-holding, and swell. Furthermore an uneven distribution will cause surface defects which give the board a poor appearance. If, for example, a series of feedscrews are used the pressure exerted by the feedscrews will promote matting and interfelting and is likely to damage the structure of the platelets. There is the further disadvantage that with many dispersion units such as the mechanical device mentioned above further levelling will be necessary before the furnish is supplied to the dispersion units. A conventional feed hopper with an opening at the bottom to regulate the flow and with a device such as a vibrator, spiked roll or the like to promote flow through the opening is not entirely satisfactory as the material is likely to become matted when it is packed together at the outlet and it is difficult entirely to eliminate the possibility of bridging.

The object of this invention is to provide a metering device for metering the supply of products such as coated or uncoated shavings or the like which will provide an accurately controlled flow of evenly distributed material.

A further object of this invention is to provide a device of the type described in which the tendency of the material to mat and pack is minimized, and in which there is little likelihood of damage to the material. These objects are achieved in accordance with this invention by providing a metering device comprising a bin defined by a moving base member preferably of variable speed such as a continuous belt with an upwardly extending control member forming the end of the bin which is in the direction of movement of the belt, a stop member providing the end wall opposite to the control member and confining side walls. The control member is spaced from the moving base member to provide a discharge outlet for the metered material. Provision is preferably made to adjust the discharge outlet in order to help control feed rate. The control member is preferably in the form of a continuous belt of variable speed, adapted to move in a direction such that its surface facing the interior of the bin moves upwardly, fitted with lifting means such as transverse cleats. The control member and the moving base member combine to keep the shavings within the bin fluidized by imparting a constant swirling motion in a vertical circle. In addition the control member removes shavings from the material passing towards the discharge outlet which are in excess of the amount which it is desired to be metered without compressing or damaging the shavings.

While this invention has primarily been provided to deal with the particular problems outlined above arising in connection with the metering of coated wood shavings, it will be appreciated that an apparatus in accordance with this invention can be applied to the metering or distribution of such other materials as are capable of being fluidized in the manner described above, and can also be used in the mixing of non free-flowing materials during the application of chemicals.

In the drawings which illustrate the preferred embodiment of this invention,

Figure 1 is a sectional side elevation view of an apparatus in accordance with this invention;

Figure 2 is an end elevation view of the apparatus shown in Figure 1;

Figure 3:
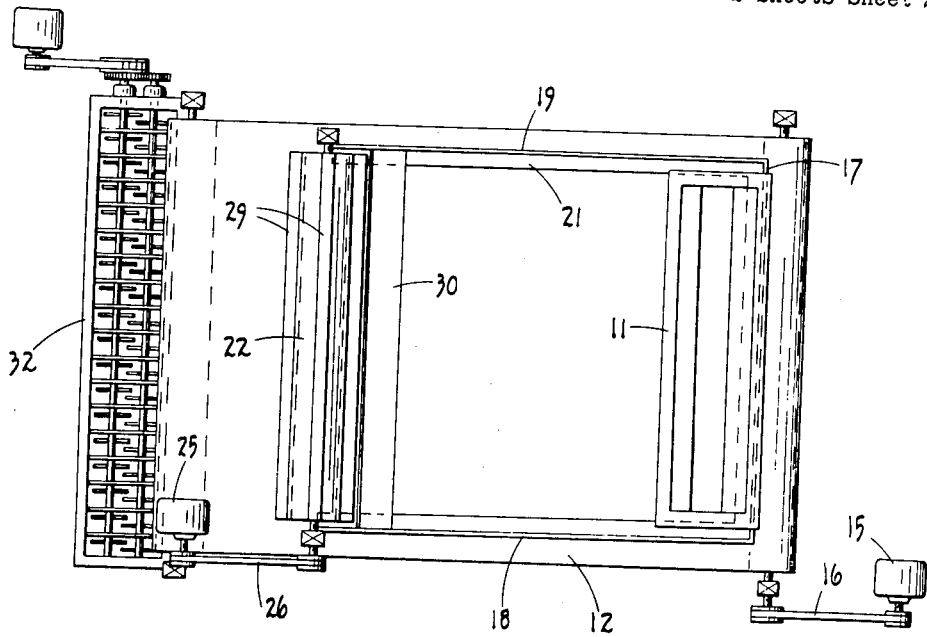
Figure 3 is a plan view of the apparatus shown in Figures 1 and 2.

In the drawings the material being metered which can be platelets coated with synthetic resin and having a length of about 0.75 to 1.5 inches, a width of 0.010 to 0.020 inch and a caliper of 0.004 to 0.010 inch, is designated by the numeral 10. This material is fed into the metering unit from storage bin 11.

The metering unit consists of a moving base member such as continuous belt 12 which is mounted on rollers 13, 14 and 14a and driven by motor 15 and drive belt 16 in a direction such that the upper surface of the belt is moving to the left in Figure 1. Roller 14a is a backing idling roller which supports belt 12 directly under the control member which will be described below. Preferably roller 14a is a profiling roll slightly wider at the middle than the ends to compensate for the frictional effect of the side plates on the material circulating in the unit. Belt 12 is shown in Figure 1 as being substantially horizontal but it may alternatively be at a slight angle of inclination in its direction of movement. A bin is defined on the surface of the belt by stop plate 17, side plates 18 and 19 and control member 20. A curved apron 21 is affixed to the lower inside edge of side plates 18 and 19 and stop plate 17 to prevent the shavings passing between these members and belt 12.

Control member 20 consists of a moving belt 22 mounted on rollers 23 and 24 so that the belt 22 extends upwardly. Belt 22 is shown in Figure 1 as being substantially vertical but it may also alternatively be at a slight angle of inclination from the vertical position. Roller 24 is driven by motor 25 through drive belt 26 in a direction such that the inner surface of the belt moves upwardly. The lower portion 27 of the belt which passes around roller 23 is spaced from the surface of belt 12 to provide a transversely extending discharge aperture 28. Since backing roll 14a supports belt 12 directly under control member 20 accurate control of the dimensions of discharge aperture 28 will be provided even if there is some slack in belt 12. Transversely extending cleats 29 are disposed on the surface of belt 22. During the operation of the metering unit cleats 29 will be moving inwardly at portion 27 of belt 22 immediately above the discharge outlet to deflect back into the interior of the metering unit any material carried forward by belt 12 toward the discharge outlet 28 in excess of the amount which is desired to be metered. The cleats thus control the height of the material discharged or metered through outlet 28. The cleats 29 also have the important function of cooperating with belt 12 to impart a swirling movement in a vertical circle to the material in the interior of the metering unit, thereby keeping this material fluidized and thus avoiding matting and bridging. The swirling movement can be controlled by varying the speeds of conveyor belts 12 and 22. The amount of material metered can be controlled by varying the speeds of conveyor belts 12 and 22 and by raising or lowering control belt 20 or conveyor belt 12 to vary the height of discharge outlet 28. The material metered through discharge outlet 28 flows over the end 31 of belt 12 and passes into distributing unit 32. A deflection plate 30 which has a convexly curved inner surface is mounted in contact with the surface of the belt 29 at the upper inner end thereof and is directed downwardly and inwardly. This deflection plate deflects the material inwardly to prevent material being carried over the top and to guide the air currents produced during the swirling. Instead of, or in addition to the deflection plate, a revolving brush, a spike roll or a series of air jets can be used.

Figure 4:
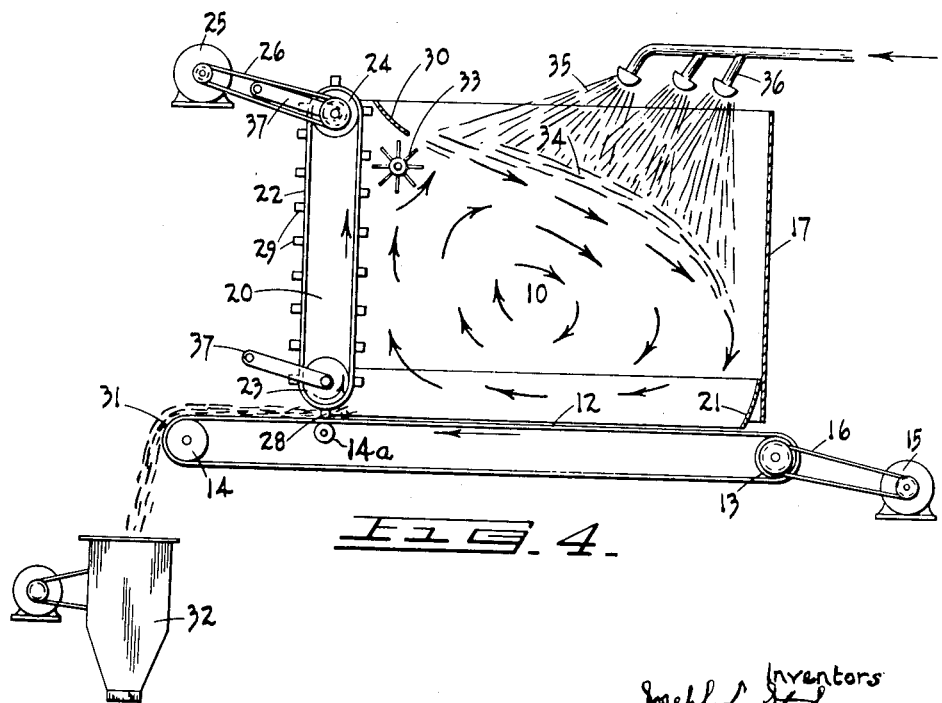
Figure 4 is a sectional side elevation view of an apparatus in accordance with this invention when adapted for use as a metering and/or coating device.

Figure 4 shows an apparatus similar to that shown in Figure 1 modified so that it can also be used as a mixing device for the application of chemicals. The combined action of the control and moving base members keep the shavings within the bin fluidized by imparting a constant swirling motion in a vertical circle. By temporarily closing the discharge outlet the material within the bin is prevented from leaving the bin. While the material is being swirled about the chemical additives can either be added in a dry state and mixed mechanically or they can be added foamed or sprayed in by using conventional nozzles. After coating the material it can be metered out directly by opening the discharge outlet. If the chemicals are to be sprayed then a spiked roll near the upper part of the control member moving in opposite direction of said member can be of advantage by throwing the material in a dense curtain through the area covered by the spray. Thus in Figure 4 the discharge outlet 28 is shown as closed by lowering the control member 20 until the cleats 29 on the surface of the belt 22 brush against the surface of belt 12 when both are in motion. Means such as arms 37 can be provided for mounting control member 20 so that it can be raised or lowered. Alternatively the moving base member can be raised to close discharge outlet 28. A spiked roll 33 revolving in opposite direction of the control belt 22 and located under the deflection plate 30, which could alternatively be a brush or a series of air jets, throws the material to be sprayed in a wide and dense curtain 34 under the area covered by spray 35 of one or a series of nozzles 36. Any material passing upward through the spiked roll 33 and not thrown back will be caught by the deflection plate 30 or brush or air jets and prevented from being carried over the top. After the shavings have been coated the discharge outlet 28 is opened and the shavings fed into the distributing unit 32.

It will be appreciated from the foregoing that an apparatus in accordance with this invention is well adapted to achieve the object set forth.

We claim:

1. An apparatus for the purposes described comprising a bin defined by a moving base member, an end wall, side walls and a control member opposite to said end wall, said control member being spaced from said base member to define a discharge outlet, means for moving the surface of said base member at a variable speed in the direction of the discharge outlet and deflection means at the upper end of said control member to deflect material inwardly from said control member, said control member having a surface movable at a variable speed and including means to deflect material in excess of the quantity to be metered inwardly into the interior of the bin and to cooperate with said moving base to impart a swirling movement to said material.

2. An apparatus for the purposes described, comprising a bin defined by a moving base member, an end wall, side walls and a control member opposite to said end wall and comprising an upwardly extending continuous belt with its lower end defining the upper edge of the discharge outlet, said belt being movable in a direction such that its inwardly facing surface moves upwardly, said control member being spaced from said base member to define a discharge outlet, means for moving the surface of said base member in the direction of the discharge outlet, and deflection means at the upper end of said control member to deflect material inwardly from said control member, said control member including means to deflect material in excess of the quantity to be metered inwardly into the interior of the bin and to cooperate with said moving base to impart a swirling movement to said material.

3. An apparatus as in claim 2 in which the control member includes lifting means on the surface of the belt.

4. An apparatus as in claim 3 in which said lifting means comprise transversely extending cleats.

References Cited in the file of this patent

UNITED STATES PATENTS

| | | |
|---|---|---|
| 1,157,092 | Du Rell | Oct. 19, 1915 |
| 1,977,513 | Holbeck | Oct. 16, 1934 |
| 2,737,997 | Hommelheber et al. | Mar. 13, 1956 |